United States Patent [19]
Fuller et al.

[11] 3,822,530
[45] July 9, 1974

[54] CHROMATOGRAPHIC COLUMN PACKING

[75] Inventors: Edward N. Fuller, Bartlesville, Okla; Michael E. Bartholomew, East Meadow, N.Y.

[73] Assignee: Phillips Petroleum Company, Bartlesville, Okla.

[22] Filed: Nov. 8, 1971

[21] Appl. No.: 196,763

Related U.S. Application Data

[63] Continuation-in-part of Ser. No. 44,596, June 8, 1970, abandoned.

[52] U.S. Cl. .................................. 55/67, 55/386
[51] Int. Cl. ............................... B01d 15/08
[58] Field of Search .......... 55/67, 197, 386; 210/31, 210/198 C; 23/232 C

[56] References Cited
UNITED STATES PATENTS

| | | | |
|---|---|---|---|
| 3,357,158 | 12/1967 | Hollis | 55/67 |
| 3,458,976 | 8/1969 | Hollis | 55/386 |
| 3,488,922 | 1/1970 | Kirkland | 55/67 |
| 3,549,525 | 12/1970 | Klatyk | 210/198 X |
| 3,663,263 | 5/1972 | Bodre et al. | 55/386 X |

*Primary Examiner*—John Adee

[57] ABSTRACT

A chromatographic column packing comprising a polymeric film on a support, the formation of the polymer and its deposition on the support being made in situ.

10 Claims, No Drawings

CHROMATOGRAPHIC COLUMN PACKING

This is a continuation-in-part of our application Ser. No. 44,596, filed June 8, 1970 now abandoned.

This invention relates to chromatographic column packing.

In one of its more specific aspects, this invention relates to chromatographic column packings which result in more efficient and more rapid separation of the components of a mixture passed through the column.

Partition chromatographic analyses are well known and are conducted by placing in an elongated column a finely divided solid partitioning agent or an inert solid coated with a suitable stationary phase. A fluent carrier is continuously passed through the column and a sample of material to be analyzed is injected into the carrier and carried into the column. The sample is resolved into its component parts as it progresses through the column and these components are detected by suitable means.

The use of porous polymers as column packing is well known. Such substrates include high porosity, high surface area copolymer beads made from various proportions of styrene, divinylbenzene, and/or other monomer combinations.

Such polymers, however, generally possess high column capacities or partition ratios, defined as $k_i$, where $$k_i = (t_i/t_m) - 1$$

in which $k_i$ is the partition ratio; $t_i$ is the retention of the $i$th component; and, $t_m$ is the retention time of unabsorbed components.

The high partition ratios possessed by such polymer beads place a practical limit on the extent to which such materials can be used as determined by the maximum operating temperature at which the separation can be conducted without causing decomposition of the beads.

The chromatographic column packing of this invention is largely without such limitations.

According to this invention, vapor chromatographic analyses are carried out by contacting vapors of the materials to be separated from each other in a carrier gas with a column packing which comprises a supported polymeric deposition, the deposition comprising essentially polymerized moieties derived as hereinafter described, the support being any material to which the deposition can be caused to adhere in any form whatsoever, but preferably as a film of relative uniformity.

Accordingly, it is an object of this invention to provide a chromatographic column packing which permits analyses to be conducted at greater speeds than those at which such analyses are conventionally conducted.

It is another object of this invention to provide a chromatographic column packing of improved efficiencies.

The packing of the present invention comprises a deposition of after-defined polymers bonded to, and substantially covering, the surface of a suitable support. Such a deposition when in a thin layer supplies a minimal amount of stationary phase per unit of column length. As a result, the partition ratio of the packing will be low at any temperature and flow rate for a given component. Accordingly, less time is required for analysis.

Analyses of higher molecular weight components is possible with the packing of the present invention. As mentioned, high partition ratios of conventionally employed polymer beads places an operating temperature limitation on their use because of decomposition. The lower partition ratios of the polymers of this invention permit the analysis of materials of higher molecular weight.

Furthermore, employment of this invention results in greater column efficiencies since the polymer layer of this invention permits faster mass transfer than do the bulk beads and this acts to reduce the diffusion time by shortening the average diffusion path in the stationary phase. As a consequence of the improved partition ratio and the greater column efficiency, higher flow rates and longer columns can be employed and hence, more difficult separations can be performed.

Polymers which are employable in this invention are formed from difunctional monomers such as those having two polymerizable vinyl

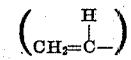

or vinylidine

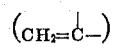

groups or one of each per molecule, for example, divinylbenzene, divinyltoluene, divinylxylene, ethylene glycol dimethylacrylate, and the like. These polymers can be homopolymers or copolymers of said difunctional monomers and/or copolymers thereof with various monofunctional polymerizable compounds such as styrene, methyl methacrylate, 3-vinylpyridine, acrylonitrile 4-vinylpyridine, 2-vinylpyridine, N-vinylpyrrolidone, and so forth. It is desirable that the difunctional monomer be present in the polymer in order that the polymer layer posses adequate rigidity and insolubility while maintaining the necessary porous structure after removal of the solvent employed in the process, as hereinafter discussed.

Generally, the materials which are employed to form what will be referred to hereinafter as the polymer or polymer layer or film, will consist essentially of polymerized moieties of a difunctional monomer selected from the group consisting of divinyl monocyclic aromatic hydrocarbons and ethylene glycol dimethacrylate and mixtures thereof containing about 20 mole percent of at least one of said difunctional monomers and the remainder consisting of at least one monethylenically unsaturated monomer, copolymerizable therewith, selected from the group consisting of monovinyl monocyclic aromatic hydrocarbons, 4-vinylpyridine, 2-vinylpyridine, 3-vinylpyridine, N-vinylpyrrolidone, acrylonitrile, and methyl methacrylate.

That substance deposited on the support will be comprised of polymers with possibly some temporary occlusion of the monomers and solvent therefor, the polymers comprising the component significant in enabling the subsequent use of the coated support as the chromatographic column packing.

The substrate support can comprise any solid support material to which the film can be adhered. Suitable substrates include Chromosorbs P, W and G, as manufactured by Johns Manville Company, glass beads, and other support materials of suitable size. Such supports can possess pretreated surfaces, such pretreating including acid washing, etching and deposition of films of materials such as vinyltriethoxysilane which acts to facilitate the adherence of the polymer to the support surface.

The deposition of the support can be accomplished in a number of ways. Preferably, the monomers are dissolved in a suitable solvent, such as aliphatic hydrocarbons including heptane or in a higher molecular weight alcohol, such as 2-pentanol, or mixtures of such solvents. The resulting solution is then admixed with the chosen support. The support is employed in such an amount that the polymer deposited thereon comprises up to about 50, preferably from about 7 to about 20, weight percent of the support.

Preferably, the solution admixed with the support will contain from about 0.5 to about 4 weight percent based on the weight of the solution of a polymerization initiator such as, for example, lauroyl peroxide, benzoyl peroxide and 2,2'-azobis(2-methylpropionitrile). The amount of the solvent contained in the solution will be equivalent to a dilution ratio within the range of from about 1.5 to about 15, the term "dilution ratio" being defined as the quotient of (a) the weight of monomers plus the weight of the solvent to (b) the weight of the monomers.

The solution is brought into contact with support in any suitable manner, the total volume of solution being sufficient to wet the surface of the support with no substantial amount of liquid remaining to stand free above the support mass. The resulting mixture is then sealed from the atmosphere and subjected to polymerization conditions. This can be done by heating the mixture while agitating the mixture sufficiently to maintain it in a free-flowing condition. The mixture is heated to a temperature of about 70°–85° C. at which the polymerization reaction proceeds at a satisfactory rate, this being largely a function of the reactivity of the initiator and monomer combination, and the polymer, in effect, precipitates from solution and deposits on the support as the molecular weight of the polymer increases.

After heating and agitating the mixture for a sufficient period to effect polymerization, generally from about 4 to about 24 hours, under the usual conditions for polymerization, the solvent is removed from the solids and the solids are dried at a temperature sufficient to remove residual solvent and volatile monomers. The solids, bearing the polymer layer, are then recovered and packed into the column by conventional methods. Thereafter, helium is passed through the column and into contact with the solid packing for from 2 to 10 hours at a temperature of about 200° C. at a flow rate of about 40 ml. per minute. Passing helium through the column in this manner removes residual traces of solvent from the solids and eliminates traces of unreacted monomers and low molecular weight polymers. Upon completion of the passage of helium through the column, the column is suitable for operation in the conventional manner.

The following procedures illustrate the method of this invention.

EXAMPLE I

A solution was prepared by mixing 2.5 g of commercial grade divinylbenzene with 1 g of styrene, 0.05 g lauroyl peroxide and 40 g of pentane. The divinylbenzene was comprised of 55.5 weight percent divinylbenzene, 39.3 weight percent ehtylvinylbenzene, 3.4 weight percent of diethylbenzene, and 1.8 weight percent of other hydrocarbons. This mixture was combined with 40 g of 80/100 mesh Chromosorb P support in the manner previously described, and the mixture was brought to polymerization conditions. Solvent and unreacted monomers were removed as described previously.

About 3.5 g of the packing so produced from this process were used to pack two chromatographic columns 6 feet in height and one-eighth inch in external diameter. Observed column efficiencies were in the range of 400–600 plates per foot of column length.

EXAMPLE II

A solution of the polymerizable composition of Example I, with the exception that 40 g of heptane were substituted for the 40 g of pentane, was prepared and employed to coat 40 g of 80/100 mesh Chromosorb P. When used at 30° C. for methane-ethane separation from domestic fuel gas, the column indicated an efficiency as high as 1,000 plates per foot of length.

As previously mentioned, the materials of this invention require a considerably shorter period to effect hydrocarbon separations as compared to conventional column packings. This is illustrated by the following example.

EXAMPLE III

That packing prepared in Example I was employed in the chromatographic separation. Under substantially identical conditions, a chromatographic separation of the same hydrocarbon stream was made using Porapak (a registered trademark) Type Q as sold by Waters Associates, Inc., Framingham, Mass. Porapak Q is an unsupported polymeric material.

Under the conditions set forth below, the length of time required for detector response, or elution time for hydrocarbons of differing carbon atom content, for both packings was as indicated.

TABLE I

|  | Packing of Example I | Porapak Q |
| --- | --- | --- |
| Carrier Gas | Helium | Helium |
| Pressure of Carrier, psig | 34 | 36 |
| Carrier Flow Rate, cc/min. | 28 | 28 |
| Column Length, ft. | 6 | 6 |
| Sample Injection Temp., °C. | 220 | 220 |
| Elution Time, Sec. |  |  |
| $C_5$ | 24 | 220 |
| $C_6$ | 33 | 469 |
| $C_7$ | 51 | 1022 |
| $C_8$ | 90 | 1266 |

That difference in pressure of the carrier gas indicated in the runs was necessary in order to achieve the same flow rate through the two columns.

The above data indicate the operability of the invention. These data further indicate that the packing material of this invention reduces the required time for elution by from 80 to about 94 percent as compared to that of a conventional polymer bead packing.

EXAMPLE IV

The efficiency of the packing, that is, the maximum number of plates realized per foot of column packing produced by the method of this invention can be varied by the dilution ratio employed in depositing the polymer on the support.

The following data indicate this in an instance in which a polymer layer formed from styrene, divinylbenzene and ethylvinylbenzene, was deposited employing various dilution ratios on Chromasorb P from a solvent comprising heptane. In each instance, the maximum number of chromatographic plates per foot of packing for pentane was measured at 180° C., employing helium as the carrier gas and a flame ionization detector.

| Dilution Ratio | Approximate No. of Plates/Ft. |
|---|---|
| 3.5 | 540 |
| 6.0 | 515 |
| 8.8 | 580 |
| 10.1 | 560 |
| 12.3 | 730 |
| 15.0 | 770 |

These data indicate that the efficiency of the packing increases as the dilution ratio increases.

It will be appreciated that various modifications can be made to the invention as disclosed herein. Such, however, are considered as being within the scope of the invention.

What is claimed is:

1. In the method of chromatographic analysis in which a vaporous material is introduced into a column into contact with a packing, the improvement comprising employing as said packing a polymer positioned on a particulate support produced by the process which comprises forming in situ on a particulate support a polymer from at least one difunctional monomer in contact and admixed with a solvent and a particulate support, causing at least a portion of said polymer to be deposited as formed on said particulate support, removing the solvent and recovering said packing comprising a supported polymer, said packing, after being placed into the column, being dried at an elevated temperature for a time sufficient to remove residual traces of solvent.

2. The method of claim 1 in which said monomer is selected from the group consisting of divinylbenzene, divinyltoluene, divinylxylene and ethylene glycol dimethylacrylate, said monomer being polymerized with a monoethylenically unsaturated monomer selected from the group consisting of monocyclic monovinyl aromatic hydrocarbons, 4-vinylpyridine, 2-vinylpyridine, 3-vinylpyridine, N-vinylpyrrolidone, acrylonitrile and methyl methacrylate.

3. The method of claim 1 in which said polymer is deposited on said support in an amount up to about 50 weight percent of said support.

4. The method of claim 1 in which said solution comprises a solvent selected from the group consisting of aliphatic hydrocarbons and higher alcohols.

5. A method of preparing a chromatographic analysis column for analysis which comprises producing a packing suitable for chromatographic analysis which comprises forming in situ on a particulate support a polymer from at least one difunctional monomer in contact and admixed with a solvent and a particulate support, causing at least a portion of said polymer to be deposited as formed on said particulate support, removing the solvent and recovering said packing comprising a supported polymer.

6. The method of claim 5 in which said polymer is formed at a dilution ratio within the range of from about 1.5 to about 15.

7. An article of manufacture comprising a packing of claim 5.

8. A chromatographic column containing the packing of claim 7.

9. A chromatographic column containing the packing of claim 5.

10. A method of preparing a chromatographic analysis column for analysis which comprises producing a packing suitable for chromatographic analysis which comprises forming in situ on a particulate support a polymer from at least one difunctional monomer in contact and admixed with a solvent and a particulate support, causing at least a portion of said polymer to be deposited as formed on said particulate support, removing the solvent and recovering said packing comprising a supported polymer; wherein said polymer comprises up to about 50 weight percent and wherein the thus supported polymer is placed into said column.

* * * * *